(12) United States Patent
Goupil et al.

(10) Patent No.: US 12,423,200 B2
(45) Date of Patent: Sep. 23, 2025

(54) ESTIMATION OF A DIAGNOSIS OF A PHYSICAL SYSTEM BY PREDICTING FAULT INDICATORS BY MACHINE LEARNING

(71) Applicants: ATOS France, Bezons (FR); Centre national de la recherche scientifique, Paris (FR); INSA TOULOUSE Institut National des Sciences Appliquées de Toulouse, Toulouse (FR)

(72) Inventors: Louis Goupil, Toulouse (FR); Louise Travé-Massuyès, Caraman (FR); Élodie Chantery, Toulouse (FR)

(73) Assignees: CENTRE NATIONAL DE LA RECHERCHE SCIENTIFIQUE, Paris (FR); INSA TOULOUSE INSTITUT NATIONAL DES SCIENCES APPLIQUÉES DE TOULOUSE, Toulouse (FR); ATOS FRANCE, Bezons (FR)

( * ) Notice: Subject to any disclaimer, the term of this patent is extended or adjusted under 35 U.S.C. 154(b) by 0 days.

(21) Appl. No.: 18/407,856

(22) Filed: Jan. 9, 2024

(65) Prior Publication Data
US 2024/0241806 A1 Jul. 18, 2024

(30) Foreign Application Priority Data

Jan. 13, 2023 (EP) ..................................... 23305050

(51) Int. Cl.
*G06F 11/22* (2006.01)
(52) U.S. Cl.
CPC .............................. *G06F 11/2257* (2013.01)
(58) Field of Classification Search
CPC ............ G06F 11/2257; G05B 23/0254; G05B 23/0286; G05B 23/0281
(Continued)

(56) References Cited

U.S. PATENT DOCUMENTS

2014/0365195 A1* 12/2014 Lahiri ...................... G06N 3/02
703/12

OTHER PUBLICATIONS

European Search Report for corresponding EP Application No. 23305050, dated May 31, 2023.
(Continued)

*Primary Examiner* — Yair Leibovich
(74) *Attorney, Agent, or Firm* — MEAGHER EMANUEL LAKS GOLDBERG & LIAO, LLP

(57) ABSTRACT

The invention relates to a diagnostic system (20) for diagnosing a physical system (10) comprising means for acquiring measurements ($m_1, m_2, \ldots, m_S$) provided by sensors ($l_1, l_2, \ldots, l_S$), for providing said measurements at the input of a set (22) of predictive models ($M_1, M_2, M_3, \ldots, M_N$) each generating a fault indicator ($r_1, r_2, r_3, \ldots, r_N$), then for determining a diagnosis of said physical system from said fault indicators and a signature matrix (24) associating diagnostics and fault indicators ($r_1, r_2, r_3, \ldots, r_N$).

10 Claims, 2 Drawing Sheets

(58) Field of Classification Search
USPC .......................................................... 714/47.3
See application file for complete search history.

(56) References Cited

OTHER PUBLICATIONS

Jung, "Residual Generation Using Physically-Based Grey-Box Recurrent Neural Networks For Engine Fault Diagnosis", arxiv.org, Cornell University Library, 201 Olin Library Cornell University Ithaca, NY 14853, Aug. 11, 2020.

Combastel et al., "Combining FDI and AI Approaches Within Causal-Model-Based Diagnosis", IEEE Transactions on Systems, Man, and Cybernetics, Part B Cybernetics, IEEE Service Center, Piscataway, NJ, US, vol. 34, No. 5, pp. 2207-2221, Oct. 1, 2004.

Bregon et al., "A Common Framework for Compilation Techniques Applied to Diagnosis of Linear Dynamic Systems", IEEE Transactions on Systems, Man, and Cybernetics: Systems, IEEE, Piscataway, NJ, USA, vol. 44, No. 7, pp. 863-876, Jul. 1, 2014.

Sapountzoglou et al., :A Grid Connected PV System Fault Diagnosis Method, 2019 IEEE International Conference on Industrial Technology (ICIT), IEEE, pp. 977-982, Feb. 13, 2019.

\* cited by examiner

ESTIMATION OF A DIAGNOSIS OF A PHYSICAL SYSTEM BY PREDICTING FAULT INDICATORS BY MACHINE LEARNING

FIELD OF THE INVENTION

The invention relates to the diagnosis of physical systems by a supervision system.

CONTEXT OF THE INVENTION

The increasing complexity of certain physical systems and the increased cost effectiveness and reliability requirements lead to the need for the supervision of these systems to detect any malfunction thereof, as soon as possible and as safely as possible.

The physical systems may be of various types and varied complexities: machine tool, energy plant, in particular nuclear power plant, 3D printers, etc.

A supervision system aims to ensure proper operation of the physical system and to allow it to perform reactive and proactive actions. The design of a supervision system requires on the one hand installing a diagnostic system to perform fault detection and isolation (FDI), and on the other hand implementing fault tolerant control (FTC).

To be able to operate correctly, this supervision system must be based on precise and secure knowledge of the state of the supervised physical system. To do this, it can use sensors collecting measurements at different points of the physical system.

The quality of the measurements is therefore a crucial element to be able to guarantee first the correct operation of the physical system, and then the fault tolerance of the supervised system.

However, the supervision system itself, and in particular the measurement collection mechanisms (sensors, etc.), can also be faulty.

In order to protect against this type of fault, or defect, redundancy mechanisms are conventionally installed.

Hardware redundancy consists in having multiple sensors to measure the same quantity. Thus, a failure of a sensor will cause a difference, or residue, between the measured values and will make it possible to detect a sensor failure, and therefore to discriminate between the faults of the supervised physical system and the failures of the supervision system.

However, such a mechanism does not make it possible to which sensor is faulty, and obviously causes a significant extra cost due to the large number of sensors to be deployed and maintained.

Analytical redundancy relies on the relationships between the various measurements that can be carried out on a given physical system. By arranging sensors measuring distinct quantities, if a model is known that makes it possible to connect these quantities (for example, a pressure and a temperature in a nozzle), it is possible to determine consistencies and inconsistencies analytically.

This mechanism requires precise knowledge of the mathematical equations governing the operation of the supervised physical system in order to be able to generate the analytical redundancy relationships (ARR) that connect the measurable quantities of the physical system.

However, these mathematical equations may not be known. This is in particular the case for complex systems.

SUMMARY OF THE INVENTION

The purpose of this invention is to provide a method and a system for diagnosing a physical system that at least partially overcome the aforementioned drawbacks.

More particularly, the invention aims to provide a method for establishing a diagnosis of a physical system comprising acquiring measurements provided by sensors, providing said measurements at the input of a set of predictive models each generating a fault indicator, then determining a diagnosis of said physical system from said fault indicators and a signature matrix associating diagnostics and fault indicators.

According to preferred embodiments, the invention comprises one or more of the following features, which may be used separately or in partial combination with one another, or in full combination with one another:

said signature matrix is determined by determining a graph, determining minimally overdetermined sub-graphs from said graph, then determining said signature matrix from the set of said minimally overdetermined sub-graphs;

the determination of the minimally overdetermined sub-graphs is obtained by a Dulmage-Mendelsohn decomposition;

said predictive models are trained by forming a training set associating sets of measurements and tags representing a desired diagnosis, and by the iterative supervised training of each of said predictive models based on a desired fault indicator determined from said tag and said signature matrix;

multiple predictive models are trained for a same fault indicator, and the method comprises selecting one predictive model from among said multiple predictive models based on defined criteria.

Another aspect of the invention relates to a diagnostic system for diagnosing a physical system, comprising means for acquiring measurements provided by sensors, for providing said measurements at the input of a set of predictive models each generating a fault indicator, then for determining a diagnosis of said physical system from said fault indicators and a signature matrix associating diagnostics and fault indicators.

Another aspect of the invention relates to a supervision system comprising a diagnostic system as defined above.

Another aspect of the invention relates to a system comprising a supervision system as defined above and said physical system.

Another aspect of the invention relates to a computer program comprising instructions which, when the program is executed by a computer, lead said computer to implement the method as previously defined.

Other characteristics and benefits of the invention will become apparent upon reading the following description of a preferred embodiment of the invention, given as an example with reference to the attached drawings.

DETAILED DESCRIPTION OF THE INVENTION

A supervision system can be associated with a physical system in order on the one hand to monitor the evolution of its state, and optionally to act on certain parameters either to proactively modify the behavior, or to react to its state.

A physical system may be of different types.

In general, the invention can be of particular interest in the case of systems whose complexity is too great for it to be possible to know the precise physical equations that govern its behavior and for which structural analysis and analytical redundancy are therefore generally used.

As examples, mention may be made of a 3D printer using plastic deposition, melting of metal beads or deposition of metal layers, in the field of 3D printing, a hydraulic cylinder, a water tank, a machine tool, a mechanical arm, a drone, a solar panel, a wind turbine or even much more complex systems such as a car, an airplane or any of their sub-systems (e.g., hydraulic circuit of an airplane).

The state of this physical system can be known, or in any case estimated (for its observable part), by mechanisms for collecting measurements, called sensors. These sensors aim to measure measurable quantities of the physical system: for example, a temperature, a pressure, a content of a particular chemical compound, etc.

Figure 1:
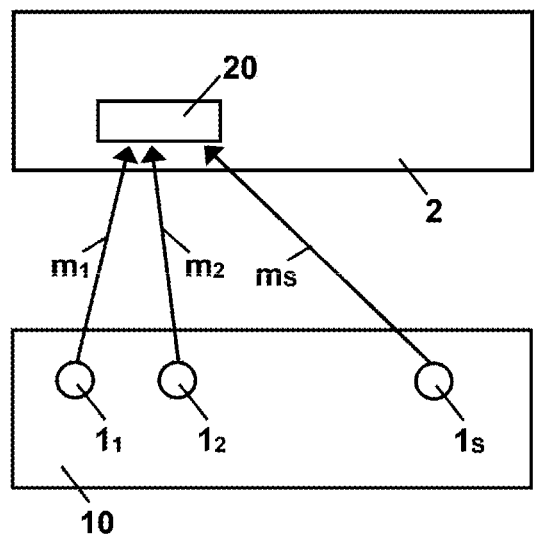
FIG. 1 schematically shows a supervision system and a supervised physical system.

In the example of FIG. 1, the physical system 10 is observed by sensors $l_1, l_2 \ldots l_S$, where S is the number of sensors. These sensors transmit measurements (or streams of measurement values), respectively $m_1, m_2, \ldots, m_S$, to a supervision system 2.

Subsequently, for clarity and conciseness, the term "measurement" may represent the value of the measurement. It is understood that each sensor is capable of transmitting measurement flows over time.

More precisely, according to one embodiment, these measurements are transmitted to a diagnostic system 20, belonging to this supervision system 2, the purpose of which is to detect any malfunction of the supervised physical system 10.

A malfunction refers to a deviation with respect to nominal operation. Typically, a threshold mechanism is put in place to detect a malfunction only when the deviation exceeds this threshold.

Different implementations exist for the transmission of measurements between the sensors $l_1, l_2 \ldots l_S$ and the diagnostic system 20. Depending on the type of physical system 10 and depending on the choice of embodiment, the transmission can be carried out by wired connections (Ethernet, etc.) or wireless connections (WiFi, Bluetooth, etc.).

The purpose of the diagnostic system 20 is to establish a diagnosis D of the supervised physical system 10. This diagnosis D depends on the state of the supervised physical system 10 at a given instant relative to a nominal operation, and aims as much as possible to be independent of the faults (or malfunctions) of the sensors via an analytical redundancy mechanism.

A diagnosis D may indicate the absence of malfunction or identify a particular malfunction.

Conventionally, the term "fault" or "defect" or "malfunction" is used to refer to a deviation between an observed variable, or quantity, and an expected value for this same quantity. A fault of a sensor is therefore characterized by the deviation, above a certain tolerance threshold, between the actual value of the measured quantity and its measured value.

Figure 2:
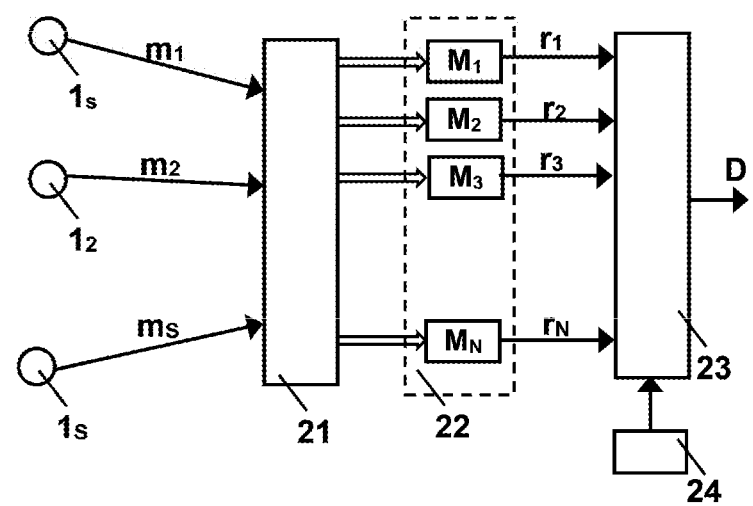
FIG. 2 schematically shows an example of a diagnostic system according to one embodiment of the invention.

FIG. 2 more specifically shows the diagnostic system 20.

According to the invention, means 21 are provided to transmit the measurements $m_1, m_2, \ldots, m_S$ collected by the sensors $l_1, l_2, \ldots l_S$, at the input of a set 22 of predictive models.

In the figure, the set 22 has N predictive models, $M_1, M_2, M_3, \ldots, M_N$, previously trained. Each predictive model $M_1, M_2, M_3, \ldots, M_N$ is associated with a fault indicator, or residue, $r_1, r_2, r_3, \ldots, r_N$, respectively.

A fault indicator, or residue, expresses the inconsistency between the available information and the theoretical information provided by a model of the physical system.

In particular here, due to the analytical redundancy, the measurement values can be confronted with the knowledge of the physical system (here modeled by a set 22 of predictive models) and the other measurements collected by the other sensors.

From a set of measurements, which may be different for each predictive model/residue pair, each predictive model can generate residue, or a fault indicator.

Each predictive model may correspond to an analytical redundancy relationship, ARR.

The concept of analytical redundancy relationship was initiated by J. E. Potter and M. C. Suman. "*Thresholdless redundancy management with array of skewed instruments. Electronic Flight Control Systems,*" 224:15-25, 1977. These analytical redundancy relationships have since been the subject matter of numerous studies and, based on a mathematical modeling of the supervised physical systems and processes, are complex to implement.

According to the invention, predictive models are used to generate fault indicators in place of these mathematical models.

These predictive models can be of different natures. They may for example involve a decision tree, random forests, neural networks, in particular multilayer neural networks, etc.

These predictive models require training in order to determine their various parameters. The training mechanism will be explained later.

Each predictive model is trained so as to be able to correctly generate a fault indicator, or residue, $r_1, r_2, r_3, \ldots, r_N$.

From these fault indicators, means 23 are provided to determine a diagnosis D.

To do this, a signature matrix 24 can be used.

A signature matrix is a data structure that associates fault indicators with a diagnosis. These associations are dependent on the choice of construction of the fault indicators so that they can on the one hand allow the determination of the various possible malfunctions and on the other hand allow their isolation, that is, allow the determination of a single diagnosis from a given set of fault indicators.

Thus, each provided diagnosis is associated with a signature that uniquely identifies it and consists of a set of values of the different fault indicators. These values can be binary or thresholded to become binary and then indicate the presence or absence of a fault for the indicator in question.

The signature matrix 24 is obviously not necessarily structured as a matrix in its implementation. However, functionally, and to facilitate understanding, it is usually presented in such a form.

An example of such a signature matrix may be as follows:

|       | $r_1$ | $r_2$ | $r_3$ | ... | $r_N$ |
|-------|-------|-------|-------|-----|-------|
| $D_1$ |       | X     | X     |     |       |
| $D_2$ |       |       | X     |     | X     |
| ...   |       |       |       |     |       |
| $D_p$ | X     | X     |       |     |       |

$D_1, D_2 \ldots D_p$ corresponding to the p predicted malfunction diagnoses. These diagnoses correspond to the malfunctions of the physical system 1 whose occurrence is to be determined.

In the example, the "X" corresponds to non-zero values, that is, the corresponding residue affects the diagnosis in question.

Therefore, using such a matrix and knowing the residues, the corresponding diagnosis $D_1, D_2 \ldots D_p$ can be deduced directly.

For example, if the residues $r_2$ and $r_3$ are not zero and the other residues are, then the diagnosis $D_1$ can be determined. Likewise, if the residues $r_1$ and $r_2$ are not zero and the others are, then the diagnosis $D_p$ can be determined.

Thus, the diagnostic system 20 can determine the diagnosis on the state of the physical system 10 based on the measurements provided by the sensors observing this physical system.

This determination can take place continuously, that is, as new measurements are captured by the sensors.

Since the predictive models are computationally fast, the diagnosis can be established on the fly. It is thus possible to react quickly. It may in fact be important to react quickly to certain malfunctions of a physical system, since certain malfunctions may lead to excess costs (production of defective products, physical risks, runaway phenomena, etc.)

Figure 3:
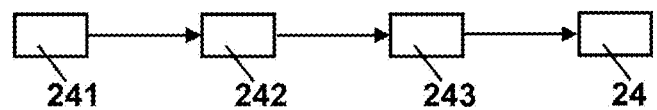
FIG. 3 schematically shows an example of a mechanism for determining a signature matrix according to one embodiment of the invention.

FIG. 3 shows an embodiment of the prior determination of this signature matrix.

First, in a step 241, a graph is determined to represent the variables of the physical system 10 and the relationships between these variables. Each relationship may correspond to a mathematical equation that governs the operation of this system and implements these variables.

It is not necessary to precisely know the equations (contrary to what is required for the generation of residues by means of analytical redundancy relationships), but only the relationships between the variables, that is, on which variables an equation depends.

The variables combine the observable quantities (which can be measured by a sensor) and the non-observable variables (physical quantities which are meaningful in the physical system but are not measurable).

The graph may comprise nodes corresponding to the variables (including the measurable quantities) and equations (or relationships), and edges corresponding to the fact that a variable is part of an equation.

According to one embodiment, this graph can be a bipartite graph. A bipartite graph is composed of a first set representing the equations of the physical system and a second set representing the variables. A connection exists between two vertices, or nodes, of two distinct sets if and only if the variable appears in the equation.

From such a graph, in a step 242, minimally overdetermined sub-graphs can be determined.

A minimally overdetermined sub-graph is a sub-graph of the bipartite graph that contains exactly one equation more than non-observable variables.

In order to obtain the minimally overdetermined sub-graphs, it is possible, for example, to use a Dulmage-Mendelsohn decomposition.

This decomposition is for example explained on the dedicated Wikipedia page: https://en.wikipedia.org/wiki/Dulmage%E2%80%93Mendelsohn_decomposition A Dulmage-Mendelsohn decomposition makes it possible to obtain, from a bipartite graph, three sub-graphs: an under-determined sub-graph, a just-determined sub-graph and a minimally overdetermined sub-graph.

This method was developed in M. Krysander and J. Aslund, "*Graph theoretical methods for finding analytical redundancy relations in overdetermined differential algebraic systems*" in IMACS World Congress, Paris, France, 2005, for the generation of analytical redundancy relationships.

Refinements and evolutions have been proposed to optimize and reduce the algorithmic complexity of this decomposition. Mention may in particular be made of M. Krysander, J. Aslund et M. Nyberg, "*An efficient algorithm for finding minimal overconstrained subsystems for model-based diagnosis*" in IEEE Transactions on Systems, Man, and Cybernetics, part A: Systems and Humans, 2008. This proposal starts from the full graph and then reduces, gradually, until a minimal structurally overdetermined (MSO) model is obtained.

Each minimally overdetermined sub-graph corresponds to an analytical redundancy relationship, which is verified when the physical system is in nominal operation.

If a minimally overdetermined sub-graph contains an equation that is no longer true when a fault takes place, that is, the sub-system that the sub-graph describes contains a component that can deviate from its nominal behavior, then the analytical redundancy relationship (ARR) of this sub-graph is an indicator of this fault. An ARR may involve multiple faults. In the case where the residue (or fault indicator) associated with this analytical redundancy relationship is non-zero (or substantially non-zero), a fault associated with this analytical redundancy relationship (ARR) has occurred.

Each residue is associated with a list of malfunctions that can take place in the sub-system represented by the corresponding sub-graph.

As seen previously, in a step 243, the signature matrix 24 is constructed by associating the value of each residue with each malfunction. This makes it possible to say which residue is meant to be activated (that is, not zero) when a given malfunction occurs in the system.

Taking the example of the signature matrix 24 provided previously, it is possible to consider a sub-graph which describes the behavior of a subsystem that can generate malfunctions corresponding to the diagnostics $D_1$ and $D_P$. The activation of the residue $r_2$ of this sub-graph demonstrates the presence of at least one of these two malfunctions.

To determine the N predictive models, $M_1$, $M_2$, $M_3, \ldots, M_N$, a training phase, or learning phase, is necessary. It consists in determining the internal parameters of each model, individually, so that it is capable of predicting a relevant fault identifier when a set of input values is submitted thereto (measurements from the sensors), the associated fault identifier of which is not known a priori. The correctly trained models are therefore able to generalize the determination of the fault identifiers to new and unknown situations.

The establishment of a training (or learning) set consists in grouping associations between measurements of the sensors and a corresponding fault identifier. To do this, all of the measurements of the physical system are collected for each malfunction to be diagnosed as well as for the nominal case.

The collection can be done using sensors $l_1, l_2, \ldots, l_s$. This collection can be carried out before the construction of the structural model and the determination of the graph (step 241) in order to know which variable of the system is observable and which variable is not.

During this collection phase, each set is associated with a tag corresponding to the associated malfunction or to the nominal case.

Figure 4:
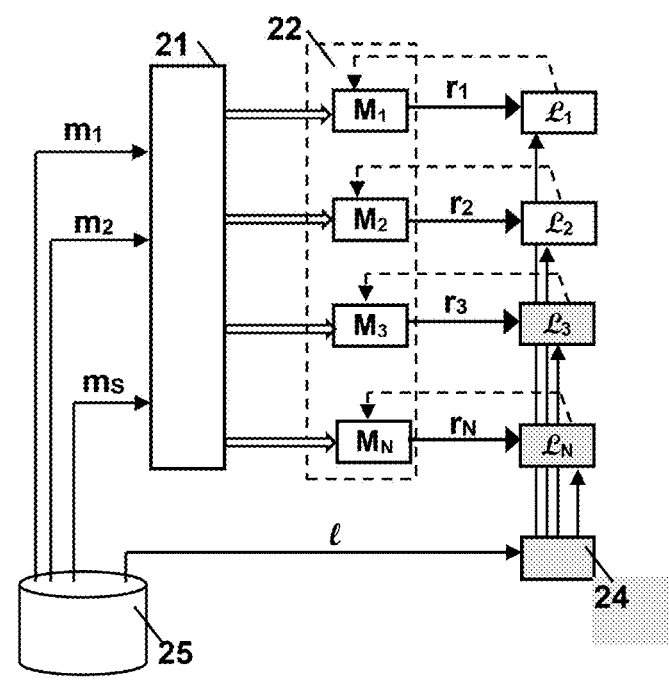
FIG. 4 schematically shows an example of a mechanism for learning predictive models according to one embodiment of the invention.

FIG. 4 shows the training (or learning) phase.

Reference 25 depicts the training set previously constructed. The latter therefore associates measurement sets $m_1, m_2, \ldots, m_S$ with a tag 1 representing a diagnosis (that is, a malfunction or the nominal case).

For all or part of this training set, the measurements are submitted to the means 21 provided to transmit these measurements $m_1, m_2, \ldots, m_s$ at the input of the set 22 of predictive models.

The predictive models then provide a residue, respectively $r_1, r_2, r_3, \ldots, r_N$.

The tag 1 associated with the measurements is used to determine desired values of the fault indicators, according to the signature matrix 24.

The fault indicators provided by the predictive models and the desired fault indicators can be compared according to a loss function $L_1, L_2, L_3, \ldots L_N$, which may be the same for each generated indicator/desired indicator pair.

The result of these comparisons is used to modify the internal parameters of the predictive models.

By iterating this process on the different associations of the training set 25, the predictive models gradually converge toward a stable state allowing them good generalization performance to be able to determine fault indicators.

According to the invention, one predictive model is therefore implemented per fault indicator, the latter being trained independently of the other predictive models (that is, based on a desired output).

According to one embodiment, multiple predictive models can be provided for a same fault indicator.

The training of each predictive model then takes place in the same way as previously, the only particularity being that multiple predictive models can have the same desired fault indicator.

A step of selecting a predictive model from among those corresponding to a same fault indicator can be set up. This selection is carried out according to criteria defined as the prediction rate and/or the run time and/or the memory space, etc.

The selected predictive model can then be used for the production phase during which the diagnostic system 20 is used to determine diagnostics of the physical system 10.

Naturally, this invention is not limited to the examples and embodiments described and shown, but rather is subject to numerous variations accessible to the person skilled in the art.

The invention claimed is:

1. A method for establishing a diagnosis of a physical system comprising acquiring measurements ($m_1, m_2, \ldots, m_s$) provided by sensors, providing said measurements at an input of a set of predictive models each generating a fault indicator, then determining a diagnosis of said physical system from said fault indicators and a signature matrix associating diagnostics and fault indicators, the set of predictive models having been trained using a training set consisting in associating sets of measurements and tags representing a desired diagnosis corresponding to an associated malfunction or to a nominal case, each predictive model of said set of predictive models having been trained, with said training set, in a supervised and iterative manner, to generate a desired fault indicator determined from a tag associated with one of said sets of measurements and said signature matrix.

2. The method of claim 1, wherein said signature matrix is determined by determining a graph to depict the variables of the physical system and relationships between the variables, determining minimally overdetermined sub-graphs from said graph, then determining said signature matrix from the minimally overdetermined sub-graphs.

3. The method of claim 2, wherein the determination of the minimally overdetermined sub-graphs is obtained by a Dulmage-Mendelsohn decomposition.

4. The method of claim 3, wherein several predictive models are trained for a same fault indicator, and comprising selecting one predictive model from among said several predictive models based on defined criteria.

5. A diagnostic system for diagnosing a physical system comprising means for acquiring measurements provided by sensors, for providing said measurements at an input of a set of predictive models each generating a fault indicator, then for determining a diagnosis of said physical system from said fault indicators and a signature matrix associating diagnostics and fault indicators, the set of predictive models having been trained using a training set consisting in associating sets of measurements and tags representing a desired diagnosis corresponding to an associated malfunction or to a nominal case, each predictive model of said set of predictive models having been trained, with said training set, in a supervised and iterative manner, to generate a desired fault indicator determined from a tag associated with one of said sets of measurements and said signature matrix.

6. A system comprising:
   a computer configured to cause performance of a diagnostic system according to claim 5;
   a physical system configured to be diagnosed by said diagnostic system; and
   sensors configured to provide measurements of said physical system to said diagnostic system.

7. A non-transitory computer-readable storage medium having a computer program product comprising instructions stored thereon which, when executed by a computer, lead said computer to implement the method according to claim 1.

8. A non-transitory computer-readable storage medium having a computer program product comprising instructions stored thereon which, when executed by a computer, lead said computer to implement the method according to claim 2.

9. A non-transitory computer-readable storage medium having a computer program product comprising instructions stored thereon which, when executed by a computer, lead said computer to implement the method according to claim 3.

10. A non-transitory computer-readable storage medium having a computer program product comprising instructions stored thereon which, when executed by a computer, lead said computer to implement the method according to claim 4.

* * * * *

UNITED STATES PATENT AND TRADEMARK OFFICE
CERTIFICATE OF CORRECTION

PATENT NO. : 12,423,200 B2
APPLICATION NO. : 18/407856
DATED : September 23, 2025
INVENTOR(S) : Louis Goupil et al.

It is certified that error appears in the above-identified patent and that said Letters Patent is hereby corrected as shown below:

In the Claims

In Claim 2, Line 2, delete the word "the".

Signed and Sealed this
Eleventh Day of November, 2025

John A. Squires
*Director of the United States Patent and Trademark Office*